(12) United States Patent
Oh et al.

(10) Patent No.: US 11,565,591 B2
(45) Date of Patent: Jan. 31, 2023

(54) METHOD OF GENERATING VIRTUAL VIBRATION EFFECT OF INTERNAL COMBUSTION ENGINE IN ELECTRIC VEHICLE

(71) Applicants: HYUNDAI MOTOR COMPANY, Seoul (KR); KIA MOTORS CORPORATION, Seoul (KR)

(72) Inventors: Ji Won Oh, Hwaseong-si (KR); Dong Chul Park, Anyang-si (KR); Jeong Soo Eo, Hwaseong-si (KR); Tae Kun Yun, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 206 days.

(21) Appl. No.: 17/171,685

(22) Filed: Feb. 9, 2021

(65) Prior Publication Data
US 2022/0072960 A1    Mar. 10, 2022

(30) Foreign Application Priority Data
Sep. 9, 2020  (KR) .................. 10-2020-0115075

(51) Int. Cl.
*B60L 15/20*    (2006.01)
*B60W 50/16*    (2020.01)

(52) U.S. Cl.
CPC ............. *B60L 15/20* (2013.01); *B60W 50/16* (2013.01); *B60L 2240/12* (2013.01); *B60L 2240/421* (2013.01); *B60L 2240/423* (2013.01); *B60L 2240/461* (2013.01); *B60L 2250/26* (2013.01); *B60W 2710/083* (2013.01); *B60W 2710/085* (2013.01)

(58) Field of Classification Search
None
See application file for complete search history.

(56) References Cited

U.S. PATENT DOCUMENTS

| | | | | |
|---|---|---|---|---|
| 10,766,479 | B2 * | 9/2020 | Galang | B60W 10/06 |
| 10,807,600 | B2 * | 10/2020 | Jordan, III | B60W 50/14 |
| 10,906,557 | B1 * | 2/2021 | Aunkst | B60W 50/16 |

(Continued)

FOREIGN PATENT DOCUMENTS

| | | |
|---|---|---|
| EP | 2287058 A1 | 2/2011 |
| FR | 3083338 A1 | 1/2020 |
| JP | 2007245764 A | 9/2007 |

(Continued)

*Primary Examiner* — Todd Melton
(74) *Attorney, Agent, or Firm* — Lempia Summerfield Katz LLC

(57) ABSTRACT

A method of generating a virtual internal combustion engine vibration in an electric vehicle includes collecting driving variable information, determining a virtual internal combustion engine vibration characteristic on the basis of the collected driving variable information, determining a vibration torque command having the determined virtual engine vibration characteristic, determining a final motor torque command using a basic motor torque command determined from the collected driving variable information and the determined vibration torque command, and controlling the operation of a vehicle driving motor according to the determined final motor torque command.

18 Claims, 10 Drawing Sheets

(56) References Cited

U.S. PATENT DOCUMENTS

2008/0060861 A1\* 3/2008 Baur .................... B60K 1/00
　　　　　　　　　　　　　　　　　　　　　　　180/65.6
2021/0053487 A1\* 2/2021 Vangelov ............... B60K 35/00

FOREIGN PATENT DOCUMENTS

| JP | 2013224058 A | 10/2013 |
| JP | 2019-151189 | 9/2019 |

\* cited by examiner

METHOD OF GENERATING VIRTUAL VIBRATION EFFECT OF INTERNAL COMBUSTION ENGINE IN ELECTRIC VEHICLE

CROSS REFERENCE TO RELATED APPLICATION

The present application claims priority to and the benefit of Korean Patent Application No. 10-2020-0115075, filed on Sep. 9, 2020, the entire contents of which is incorporated herein by reference.

FIELD

The present disclosure relates to a method of generating a virtual internal combustion engine vibration effect in an electric vehicle.

BACKGROUND

The statements in this section merely provide background information related to the present disclosure and may not constitute prior art.

As is well known, an electric vehicle (EV) is a vehicle that operates using a motor. The drive system of such an electric vehicle includes a motor provided as a vehicle driving source, a battery connected to the motor in a chargeable or dischargeable manner to supply power to drive the motor, an inverter connected to the battery to drive and control the motor, and a reducer reducing and transmitting the rotational force to drive wheels.

Here, the inverter serves to convert the direct current (DC) supplied from the battery to alternating current (AC) and apply AC to the motor via a power cable during the driving of the motor, and to convert AC generated from the motor to DC and supply DC to the battery, charging the battery.

In a conventional electric vehicle, unlike a conventional internal combustion engine vehicle, a multi-stage transmission is not used, and instead a reducer using a fixed gear ratio is disposed between the motor and the driving wheels. This is because unlike the internal combustion engine (ICE), in which a distribution range of energy efficiency is wide depending on the operating point and high torque is offered only in the high-speed region, in the case of a motor, the difference in energy efficiency from the operating point is relatively small and low speed and high torque can be realized only by the characteristics of the motor alone.

In addition, for a vehicle equipped with a conventional internal combustion engine drive system, a transmission mechanism such as a torque converter or a clutch because of the characteristics of an internal combustion engine that cannot be driven at a low speed is desired. However, the electric vehicle drive system can eliminate such a transmission mechanism because the motor is ready to be driven at a low speed. Due to this mechanical difference, electric vehicles can provide smooth driving without interruption in drivability due to shifting, unlike internal combustion engine vehicles.

In the meantime, the main vibration source in a vehicle equipped with a conventional internal combustion engine drive system is an engine (internal combustion engine). The vibration generated by the periodic explosive power in the engine in the start-on situation is transmitted to the vehicle body and passengers through a drive system or a mount. Often these vibrations are considered negative factors to be damped. In this respect, since a vibration source does not exist in an electric vehicle in which a motor replaces an engine, the electric vehicle is more advantageous than an internal combustion engine vehicle in terms of improving ride comfort.

However, for drivers who enjoy driving, the absence of vibrations from the engine can make them feel bored. In particular, an electric vehicle with a characteristic that aims for high performance is desired to offer a harsh and trembling effect, not just a soft feeling. However, in the case of the conventional motor control method in an electric vehicle, such effect may not be provided to the driver.

SUMMARY

The present disclosure provides a method of virtually generating internal combustion engine (engine) vibration as in an internal combustion engine vehicle in an electric vehicle.

The present disclosure provides a method of generating a virtual internal combustion engine vibration using a controller in an electric vehicle, the method including: collecting driving variable information for determining a torque command and generating virtual internal combustion engine vibration during driving of an electric vehicle; determining a virtual internal combustion engine vibration characteristic on the basis of the collected driving variable information; determining a vibration torque command having the determined virtual internal combustion engine vibration characteristic; determining a final motor torque command using a basic motor torque command determined from the collected driving variable information and the determined vibration torque command; and controlling the operation of a vehicle driving motor according to the determined final motor torque command.

According to the present disclosure, the internal combustion engine (engine) vibration can be virtually generated in an electric vehicle as in an internal combustion engine vehicle, thereby providing a driver with a different driving sensibility.

In addition, according to the present disclosure, the characteristics of the virtual internal combustion engine vibration can be adjusted depending on the driving information such as a drive system measurement variable, a torque command, etc., or a calculated virtual drive system variable in an electric vehicle, thereby providing a virtual vibration effect with increased realism.

Further, according to the present disclosure, the occurrence of drive system backlash and impact can be inhibited, thereby securing drive system durability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 9:
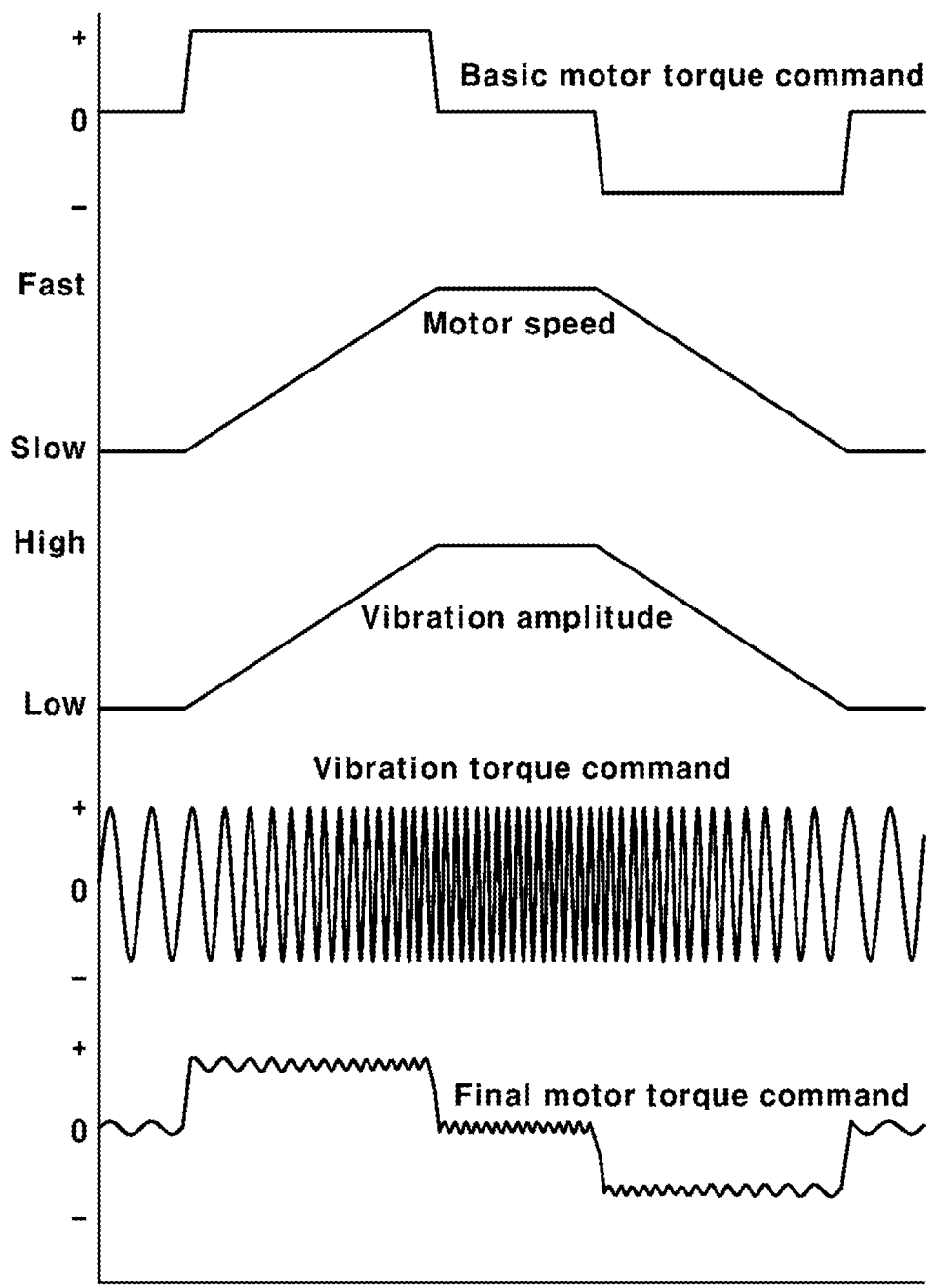
Figure 10:
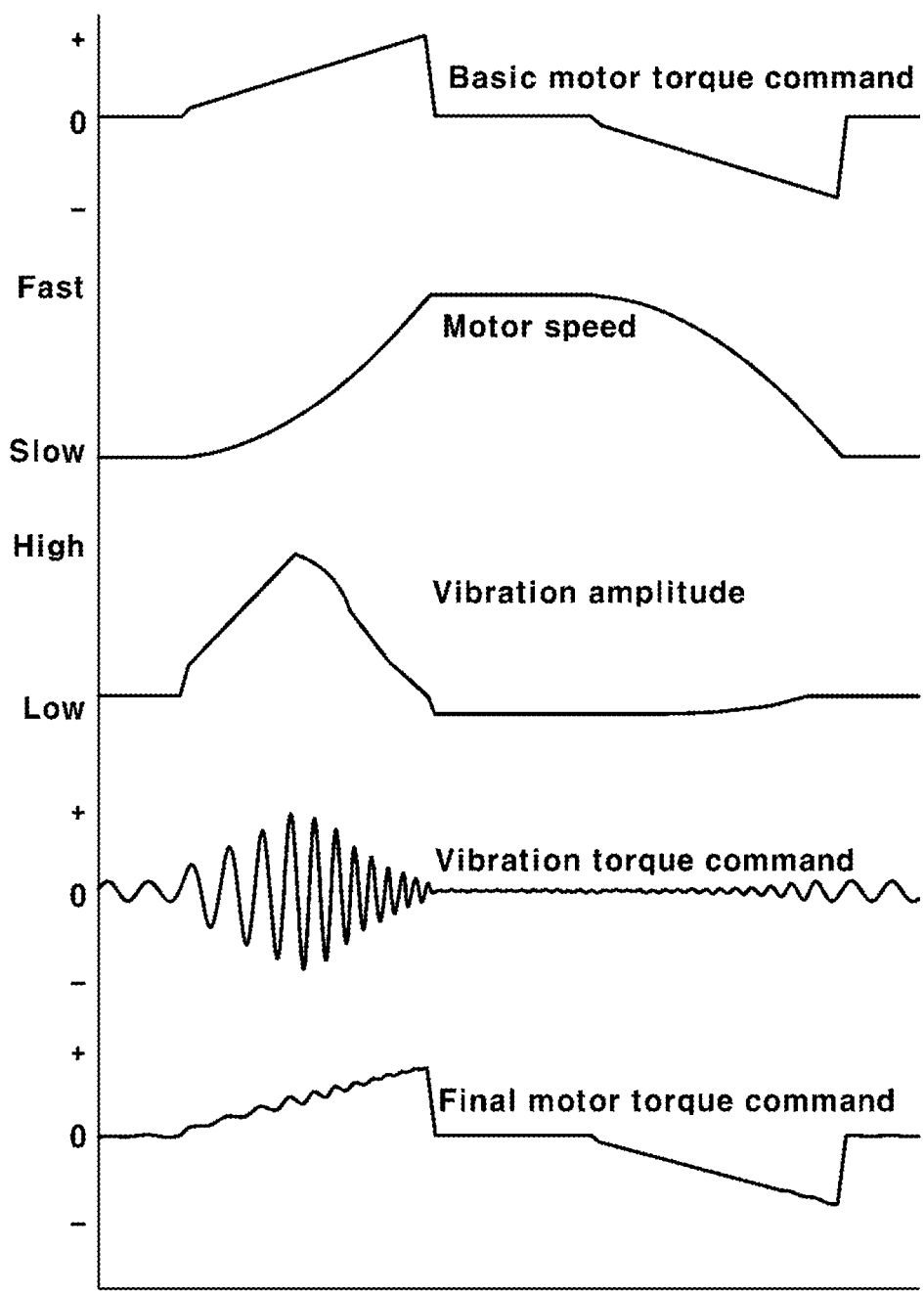

FIG. 9 is a diagram illustrating an example in which a vibration frequency is determined from drive system speed information according to another form of the present disclosure; and FIG. 10 is a diagram illustrating an example in which a plurality of virtual vibration characteristics are simultaneously determined and superimposed in order to generate a virtual internal combustion engine vibration according to another form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structures or functions described in the various forms of the present disclosure are merely for illustrative purposes. The present disclosure may be implemented in various forms, and it should be understood that they should not be construed as being limited to the various forms described in the present specification, but include all of modifications, equivalents, or substitutes included in the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

Like reference numerals denote like components throughout the specification. In the meantime, the terminology used herein is for the purpose of describing particular forms only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated components, steps, operations, and/or elements, but do not preclude the presence or addition of one or more other components, steps, operations, and/or elements thereof.

Hereinafter, the present disclosure will be described in detail with reference to the accompanying drawings.

The operations of the method or the algorithm described in connection with the examples disclosed herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The present disclosure relates to a method of realistically generating virtual internal combustion engine (engine) vibration in an electric vehicle using a driving motor. In particular, the present disclosure includes a method of determining the amplitude and period of the virtual internal combustion engine vibration in order to generate the virtual internal combustion engine vibration.

According to the present disclosure, in an electric vehicle having no internal combustion engine (engine), a virtual internal combustion engine vibration is realized by generating a torque for simulating the vibration characteristics of the internal combustion engine vehicle through a driving motor.

Figure 1:
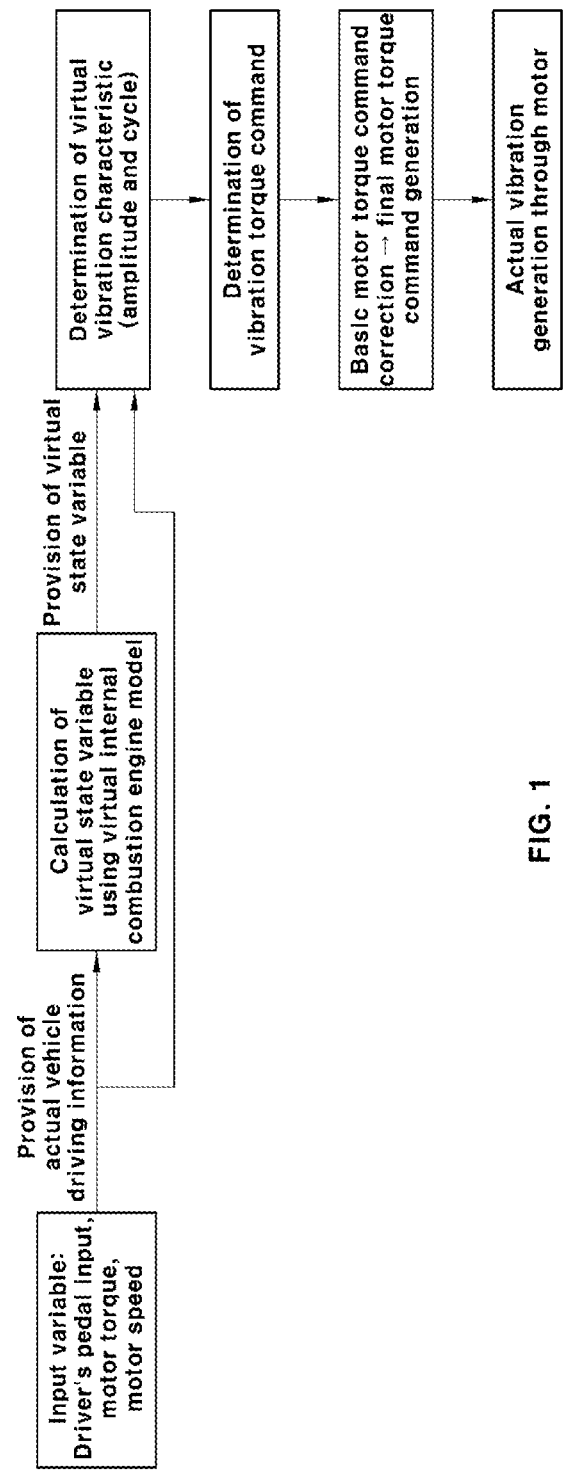
FIG. 1 is a block diagram illustrating one form of a method of generating virtual engine vibration using a virtual engine model according to the present disclosure.

FIG. 1 illustrates a principle and method of generating vibration of an internal combustion engine (engine) using a virtual engine model according to the present disclosure. In the following description, the motor used to generate the virtual internal combustion engine vibration is a driving motor that is connected to driving wheels to drive a vehicle. In addition, those of ordinary skill in the art will understand that the internal combustion engine and the engine are used interchangeably in the following description.

According to the present disclosure, actual driving variable information for realizing virtual internal combustion engine vibration during driving of an electric vehicle is collected in real time, and a vibration torque command with virtual vibration characteristics of an internal combustion engine vehicle can be determined on the basis of the actual driving variable (input variable of the virtual internal combustion engine model in FIG. 1) information. Alternatively, after the virtual state variable information in the virtual internal combustion engine (engine) model is determined on the basis of the collected actual driving variable information, a vibration torque command with vibration characteristics of the internal combustion engine vehicle to be implemented from the determined virtual state variable information can be determined. Otherwise, the vibration torque command can be determined using both the actual driving variable information and the virtual state variable information.

Here, the driving variable information is information about an actual system of an electric vehicle, which may be real-time vehicle driving information in the electric vehicle. Further, the vehicle driving information may include driver input information and driving state information in an electric vehicle.

The vehicle driving information may be sensor information that is detected by a sensor and input via a vehicle network, information that is determined by a controller of a virtual engine vibration generator according to the present disclosure, or information that is input from another controller in the vehicle to the controller of the virtual engine vibration generator.

Specifically, among items of driving variable information, the driver input information may be a driver pedal input value, which may be an accelerator pedal input value and a brake pedal input value. Here, the accelerator pedal input value (APS value) is obtained by a driver's manipulation of the accelerator pedal, and may be information that is detected by an accelerator pedal detector (APS) as described later. In addition, the brake pedal input value (BPS value) is obtained by a driver's manipulation of the brake pedal, and may be information that is detected by a brake pedal detector (BPS) as described later.

Among items of the driving variable information, the driving state information may include a motor torque and a drive system speed. Here, the motor torque may be a motor torque command determined by the controller on the basis of the vehicle driving information collected from a vehicle. More specifically, the motor torque may be a basic motor torque command determined and generated by a basic torque command generation unit (reference numeral '21' in FIG. 2) as described later.

The basic motor torque command may be determined from the driving variable information, and a method and process of determining and generating a basic motor torque command for controlling the torque output of a driving motor in an electric vehicle are known in the related art, so a detailed description thereof will be omitted.

The drive system speed may include the motor speed, which is the actual motor speed measured by a speed detector. Here, the speed detector may be a resolver installed on the driving motor as described later. Further, the drive system speed may include the driving wheel speed, and in this case, the speed detector may be a wheel speed sensor installed on the driving wheel. Further, the drive system speed may include the drive shaft speed. As described above, the drive system speed in the present disclosure may be defined as a rotary speed at an arbitrary position of a vehicle drive system including a motor, a reducer, a drive shaft, and a driving wheel.

In addition, in one form of the present disclosure, the vibration torque command may be determined as a function of the actual driving variable as described above, the vibration torque command may be determined as a function of the virtual state variable in the internal combustion engine determined from the actual driving variable value, or otherwise the vibration torque command may be determined as a function of the actual driving variable and the virtual state variable.

In one form of the present disclosure, a preset virtual internal combustion engine model may be used to obtain a virtual state variable value in an internal combustion engine from an actual driving variable value in an electric vehicle.

In one form of the present disclosure, when a virtual internal combustion engine model including a virtual engine and a virtual transmission is used, the virtual engine speed becomes the input speed of the virtual transmission. This virtual engine speed may be calculated as a variable multiple of the drive system speed detected by the speed detector, wherein the drive system speed may be a motor speed. In this case, the value of the coefficient multiplied by the motor speed to calculate the virtual engine speed may be a value determined according to the virtual transmission and gear ratio model, and the virtual current gear stage.

In an electric vehicle having no multi-stage transmission, a control method for generating a virtual transmission feeling of an electric vehicle is known so that the multi-stage transmission feeling can be generated and realized through torque control of a driving motor. In addition, it is known to use a virtual engine speed as one of the virtual state variables to generate and realize a multi-stage transmission feeling in the control process for generating the virtual transmission feeling of an electric vehicle.

As such, the virtual engine speed, which is one of the virtual state variables used to generate and realize the multi-stage transmission feeling, may be used as a virtual state variable for generating the virtual internal combustion engine vibration according to the present disclosure. In one form of the present disclosure, a virtual vibration controller may determine the virtual engine speed using the virtual vehicle speed and the virtual current gear ratio information.

Here, the virtual vehicle speed may be calculated as a value in direct proportion to the actual motor speed by using the virtual final reduction gear ratio and the actual motor speed, which is one of the actual driving variables, wherein the virtual final reduction gear ratio is a value preset in the virtual vibration controller. In one form of the present disclosure, a virtual vehicle speed may be calculated using an actual motor speed measured during vehicle driving and a virtual final reduction gear ratio, and a virtual engine speed may be calculated in real time by the virtual vehicle speed.

In this case, the virtual engine speed may be obtained from a value obtained by multiplying the virtual vehicle speed and the virtual gear ratio of the virtual current gear, or otherwise the virtual engine speed may be obtained from a value obtained by multiplying the drive system speed, such as the motor speed, and the virtual gear ratio of the virtual current gear.

In addition, the virtual current transmission stage may be determined according to a transmission schedule map preset in the virtual vibration controller from the virtual vehicle speed and the accelerator pedal input value (APS value). When the virtual current transmission stage is determined as described above, the virtual engine speed may be calculated in real time using the virtual gear ratio corresponding to the transmission stage and the virtual vehicle speed or motor speed.

The virtual state variable determined by inputting the driving variable in the virtual internal combustion engine (engine) model is used alone or together with the driving variable to determine the vibration torque command. In generating the vibration torque command, after determining the virtual vibration characteristics, a final vibration torque command having the determined virtual vibration characteristics is determined. Here, the virtual vibration characteristic may include a vibration frequency and a vibration level (or amplitude).

Subsequently, the vibration torque command determined as described above is added to the original motor torque command, and then the operation of the motor is controlled according to the summed final motor torque command to generate torque through the motor. As a result, virtual vibrations such as actual internal combustion engine vibrations can be generated.

In one form of the present disclosure, the vibration torque command becomes a correction torque command used to generate a virtual internal combustion engine vibration. Further, the original motor torque command is a command corresponding to the driver-requested torque determined according to the driver's driving input value, that is, a basic motor torque command, which becomes the motor torque command before correction. Further, in the present disclosure, correcting the original motor torque command may mean that the vibration torque command is added to the original motor torque command. At this time, the summed final motor torque command becomes the corrected motor torque command.

Hereinafter, a method of generating virtual vibration according to one form of the present disclosure will be described in more detail with reference to the following drawings.

Figure 2:
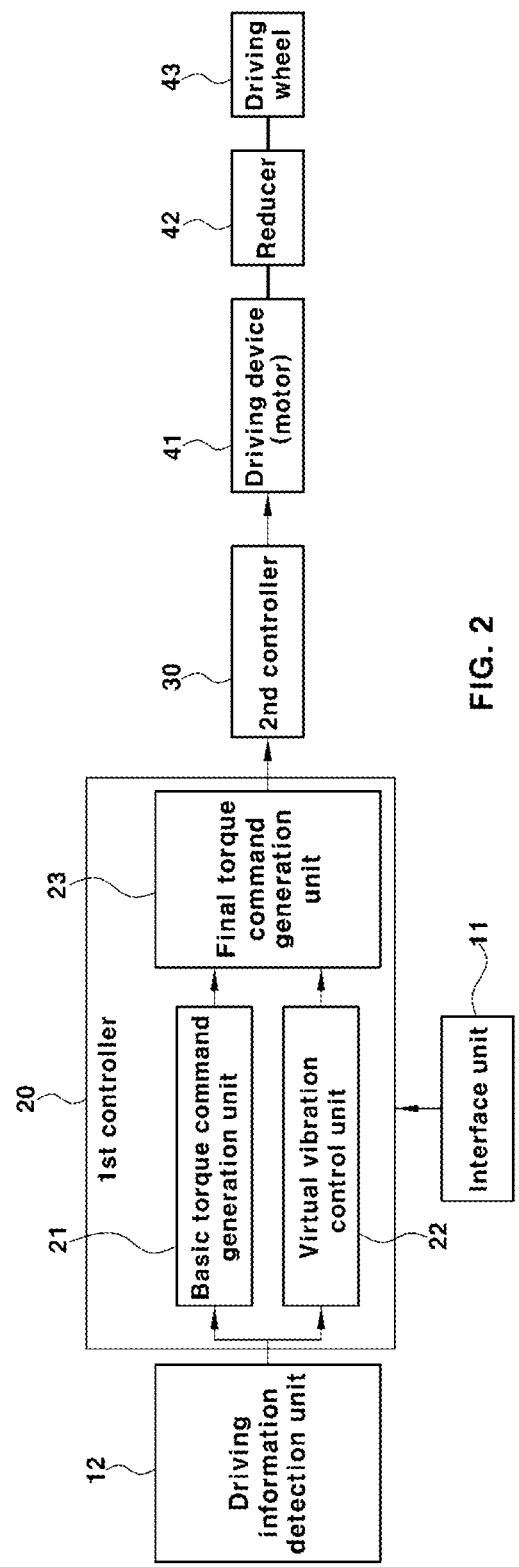
FIG. 2 is a block diagram illustrating a configuration of an apparatus for performing a virtual engine vibration generation process according to one form of the present disclosure.
Figure 3:
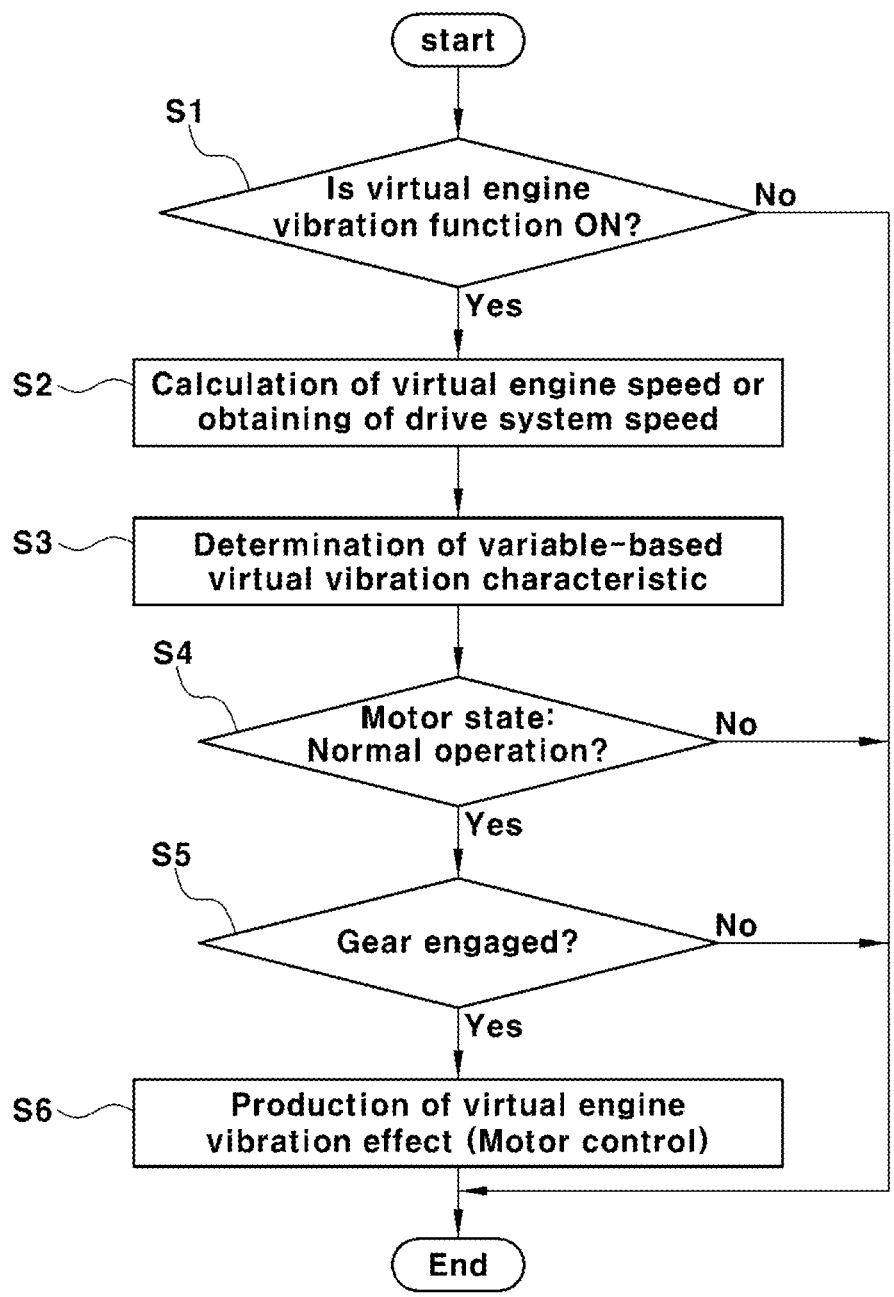
FIG. 3 is a flowchart illustrating a process of generating virtual engine vibration according to one form of the present disclosure.

FIG. 2 is a block diagram illustrating the configuration of an apparatus for performing a virtual engine vibration generation process according to one form of the present disclosure, and FIG. 3 is a flowchart illustrating a process of generating virtual engine vibration according to one form of the present disclosure.

As illustrated in FIG. 2, the apparatus for performing the virtual internal combustion engine vibration generation process includes a driving information detector 12 that detects vehicle driving information (which is driving variable information), a first controller 20 that generates and outputs a torque command on the basis of the vehicle driving information detected by the driving information detector 12, and a second controller 30 that controls the operation of a driving device 41 according to the torque command output from the first controller 20.

In addition, the apparatus for performing the virtual internal combustion engine vibration generation process may further include an interface unit 11 that is provided to allow a driver to selectively input either ON or OFF of the virtual internal combustion engine vibration generation function.

Although the controller has been illustrated as being divided into the first controller 20 and the second controller 30, the vibration generation control process and the vehicle driving control process may be performed by a single integrated controller, instead of the plurality of controllers.

The single integrated controller and the individual controllers may be collectively referred to as a controller, and the control process for generating the virtual internal combustion engine vibration as described below may be performed by this controller. For example, both the first controller 20 and the second controller 30 in the forms to be described later may be collectively referred to as the controller.

The interface unit 11 may be any kind of interface unit so long as it has a function for a driver to manipulate ON and OFF of the virtual internal combustion engine vibration generation in a vehicle. For example, the interface unit may be an operation device such as a button or switch provided in a vehicle, or an input device or a touch screen of an audio, video, navigation (AVN) system.

The interface unit 11 may be connected to the first controller 20, more specifically, a virtual vibration control unit 22 in the first controller 20, which will be described later. Accordingly, when a driver manipulates an ON or OFF operation through the interface unit 11, an ON or OFF signal from the interface unit 11 may be input to the virtual vibration control unit 22 of the first controller 20. As a result, the virtual vibration control unit 22 of the first controller 20 can recognize the driver's ON or OFF operation state of the virtual internal combustion engine vibration generation function (see step S1 in FIG. 3).

In the present disclosure, the function of generating the virtual internal combustion engine vibration during vehicle driving is executed only when the driver inputs an ON operation through the interface unit 11. In addition, the interface unit 11 may be an in-vehicle input device provided in a vehicle, or otherwise the interface unit may be a mobile device through which a driver can input an ON/OFF operation of the virtual internal combustion engine vibration generation function. The mobile device needs to be communicatively connected to an in-vehicle device, for example, the first controller 20, and for this purpose, an input/output communication interface for communication between the mobile device and the first controller 20 is used.

The driving information detector 12 is a unit that detects vehicle driving information (driving variable information) to perform a virtual internal combustion engine vibration generation function, together with vehicle driving information (driving variable information) to generate a basic motor torque command in a vehicle. In one form of the present disclosure, the driving information detector 12 includes an accelerator pedal detection unit that detects accelerator pedal input information (accelerator pedal input value) according to a driver's accelerator pedal operation, a brake pedal detection unit that detects brake pedal input information (brake pedal input value) according to a driver's brake pedal operation, and a speed detection unit that detects a speed of a vehicle drive system.

Here, the accelerator pedal detection unit may be a conventional accelerator position sensor (APS) that is installed on the accelerator pedal to output an electric signal according to a driver's accelerator pedal operation state. The brake pedal detection unit may be a conventional brake pedal sensor (BPS) that is installed on the brake pedal to output an electric signal according to a driver's brake pedal operation state.

The speed detection unit is provided to obtain speed information of the vehicle drive system, wherein the speed information of the vehicle drive system may include a motor speed, that is, a rotary speed of a driving motor 41. In this case, the speed detection unit may be a resolver installed on the driving motor 41. Alternatively, the speed information of the vehicle drive system may include the rotary speed (driving wheel speed) of a driving wheel 43, and in this case, the speed detection unit may be a wheel speed sensor installed on the driving wheel 43. Alternatively, the speed information of the vehicle drive system may include the rotary speed (drive shaft speed) of a drive shaft, and in this case, the speed detection unit may be a sensor capable of detecting the rotary speed of the drive shaft.

In addition, the first controller 20 may include a basic torque command generation unit 21 that determines and generates a basic motor torque command generation unit that determines and generates a basic motor torque command from vehicle driving information, a virtual vibration control unit 22 that determines and generates a corrected torque command (i.e., a vibration torque command) for generating a motor vibration for a virtual internal combustion engine vibration using one or both of an actual driving variable and a virtual state variable, and a final torque command generation unit 23 that generates a final motor torque command corrected by correcting the basic motor torque command with the corrected torque command.

The basic motor torque command is a motor torque command that is determined and generated on the basis of vehicle driving information collected during driving of a conventional electric vehicle, and the basic torque command generation unit 21 may be a vehicle control unit (VCH) or a part thereof that generates a motor torque command on the basis of vehicle driving information of a conventional electric vehicle.

In addition, the virtual vibration control unit 22 is a novel component that determines, generates, and outputs the vibration torque command, which is a corrected torque command only for realizing virtual internal combustion engine vibration, apart from the basic motor torque command according to the present disclosure. The virtual vibration control unit may be added as part of the vehicle controller or may be provided as a separate control element from the vehicle controller.

In one form of the present disclosure, the virtual vibration control unit 22 is a control element that performs overall control for realizing virtual internal combustion engine vibration, and acquires the virtual state variable information in the internal combustion engine (virtual internal combustion engine model) on the basis of the variable, together with actual driving variables (drive system speed, etc.) in an electric vehicle (see step S2 in FIG. 3).

In addition, the virtual vibration control unit 22 determines virtual vibration characteristics using one or both of an actual driving variable and a virtual state variable (see step S3 in FIG. 3), and determines and generates the final corrected torque command (vibration torque command) for generating virtual internal combustion engine vibration from the determined virtual vibration characteristic information.

In the final torque command generation unit 23, the basic motor torque command input from the basic torque command generation unit 21 is corrected by the corrected torque command input from the virtual vibration control unit 22, and the final motor torque command may be calculated by summing the corrected vibration torque command and the basic motor torque command.

The second controller 30 receives the torque command transmitted from the first controller 20, that is, the final motor torque command determined by the final torque command generation unit 23 of the first controller 20 so as to control the operation of the driving device 41. Here, the driving device 41 is a driving motor 41 that is connected to the driving wheel 43 to drive a vehicle. At this time, the second controller 30 may be a known motor control unit (MCU) that drives the driving motor 41 through an inverter and controls the driving of the driving motor 41 in a conventional electric vehicle.

In one form of the present disclosure, the vibration torque command for generating the virtual internal combustion engine vibration is for imparting virtual internal combustion engine vibration to the torque of the motor in order to producing a slight tremor of the motor torque matching the virtual vibration characteristic. The vibration torque command may have a command value that fluctuates in a wave form having a predetermined frequency (or cycle) and amplitude (vibration amplitude). That is, the vibration torque command may have a command value linked to the virtual vibration characteristic, and for example, may have a command value corresponding to the vibration frequency (or cycle) and amplitude (vibration amplitude) among the virtual vibration characteristics.

In one form of the present disclosure, the torque and rotary force output by the motor, which is the driving device 41, are reduced by the reducer 42 and then transmitted to the driving wheel 43 as illustrated in FIG. 2. When the driving of the motor 41 is controlled according to the final motor torque command corrected by the vibration torque command as described above, the motor torque is output together with the virtual internal combustion engine vibration.

In FIG. 3, after the final motor torque command is determined by correcting the basic motor torque command according to the vibration torque command having virtual vibration characteristics, it is checked whether the motor state is in a normal operation state in step S4, a geared state is checked in step S5, and then the driving of the motor 41 is controlled according to the final motor torque command in step S6, thereby providing the vibration effect.

Meanwhile, in the virtual vibration control unit 22 of the first controller 20, the virtual vibration characteristics may be determined by using the actual driving variable and the virtual state variable as described above, for example, the virtual vibration characteristics on the basis of the motor torque and the motor speed, and a vibration torque command for generating the virtual internal combustion engine vibration is determined from the determined virtual vibration characteristics.

Figure 4:
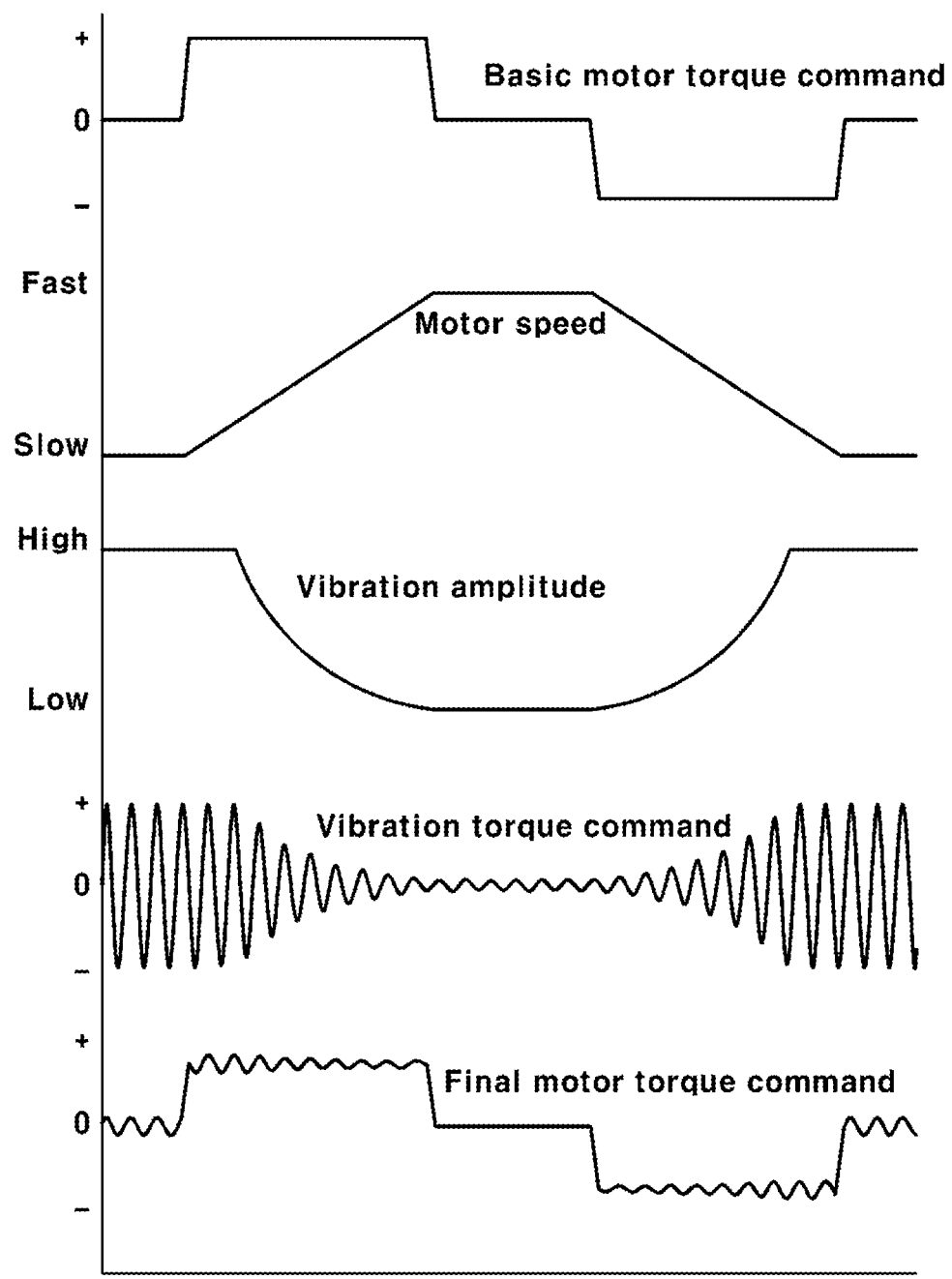
FIG. 4 is a diagram illustrating an example in which a vibration level is determined from drive system speed information according to one form of the present disclosure.

FIG. 4 is a diagram illustrating a state in which a final motor torque command for realizing virtual internal combustion engine vibration is generated on the basis of a vibration amplitude determined from drive system speed information according to one form of the present disclosure. As illustrated in FIG. 4, when a basic motor torque command is determined and a motor speed is detected in real time, the vibration amplitude among virtual vibration characteristics may be determined from the detected motor speed. Subsequently, when the vibration torque command having the determined vibration amplitude is determined, the final motor torque command may be determined by correcting the basic motor torque command with the vibration torque command. At this time, the final motor torque command may be determined as a value obtained by adding the vibration torque command to the basic motor torque command.

In the form of FIG. 4, the vibration amplitude among the virtual vibration characteristics is determined from the motor speed, which is the drive system speed, and this motor speed may be replaced by the vehicle speed, or the virtual engine speed, which is the virtual drive system speed. Here, the vehicle speed may be an actual vehicle speed detected by a sensor, or a virtual vehicle speed calculated as a value directly proportional to the actual motor speed by using the actual motor speed, which is an actual drive system speed, and a virtual final reduction gear ratio, as described above. Since the vehicle speed is also related to the drive system speed such as the motor speed, it may be used as speed information for implementing the virtual internal combustion engine vibration according to the present disclosure.

Figure 5:
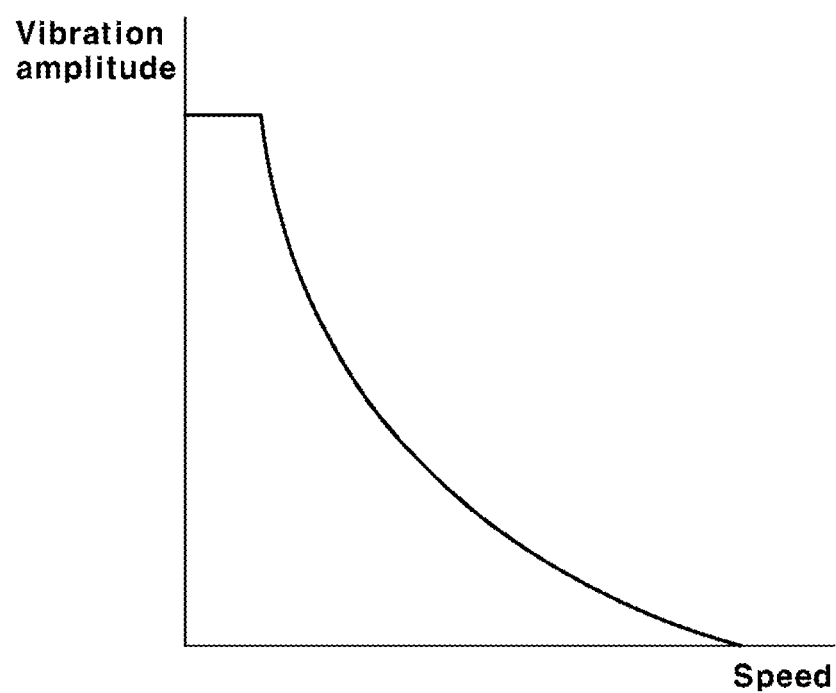
FIG. 5 is a diagram illustrating the vibration level for the drive system speed according to one form of the present disclosure.

FIG. 5 illustrates the vibration amplitude according to the drive system speed information, wherein the drive system speed may be an actual motor speed that is an actual drive system speed, or a virtual engine speed that is a virtual drive system speed, or a vehicle speed, as described above.

In addition, as will be described later, it may be set that the vibration amplitude is determined using both the drive system speed and the drive system torque (motor torque, APS value, etc.) information (refer to the description with respect to FIG. 10). That is, both the vibration amplitude determined from the actual motor speed and the vibration amplitude determined from the motor torque command may be used to generate the vibration torque command.

In one form of the present disclosure, as the drive system speed increases, the vibration amplitude may be determined as a smaller value. In order to determine the vibration amplitude, which is a virtual vibration characteristic, from the drive system speed information, setting information defining a correlation between the speed and the vibration amplitude may be input and stored in advance in the controller. Here, the setting information may be a map, a diagram, or a function formula capable of determining the vibration amplitude using a speed as an input.

Referring to FIG. 5, a diagram in which the vibration amplitude is set to a value according to the speed is illustrated, and it can be seen that the higher the speed, the smaller the vibration amplitude is set. Using this diagram, the vibration amplitude according to the current drive system speed (motor speed) may be determined. In addition, when the virtual engine speed is in an idle state or when the vehicle speed is in a stationary state, it is possible to virtually produce the engine idle vibration by setting the vibration amplitude to a set maximum value.

Figure 6:
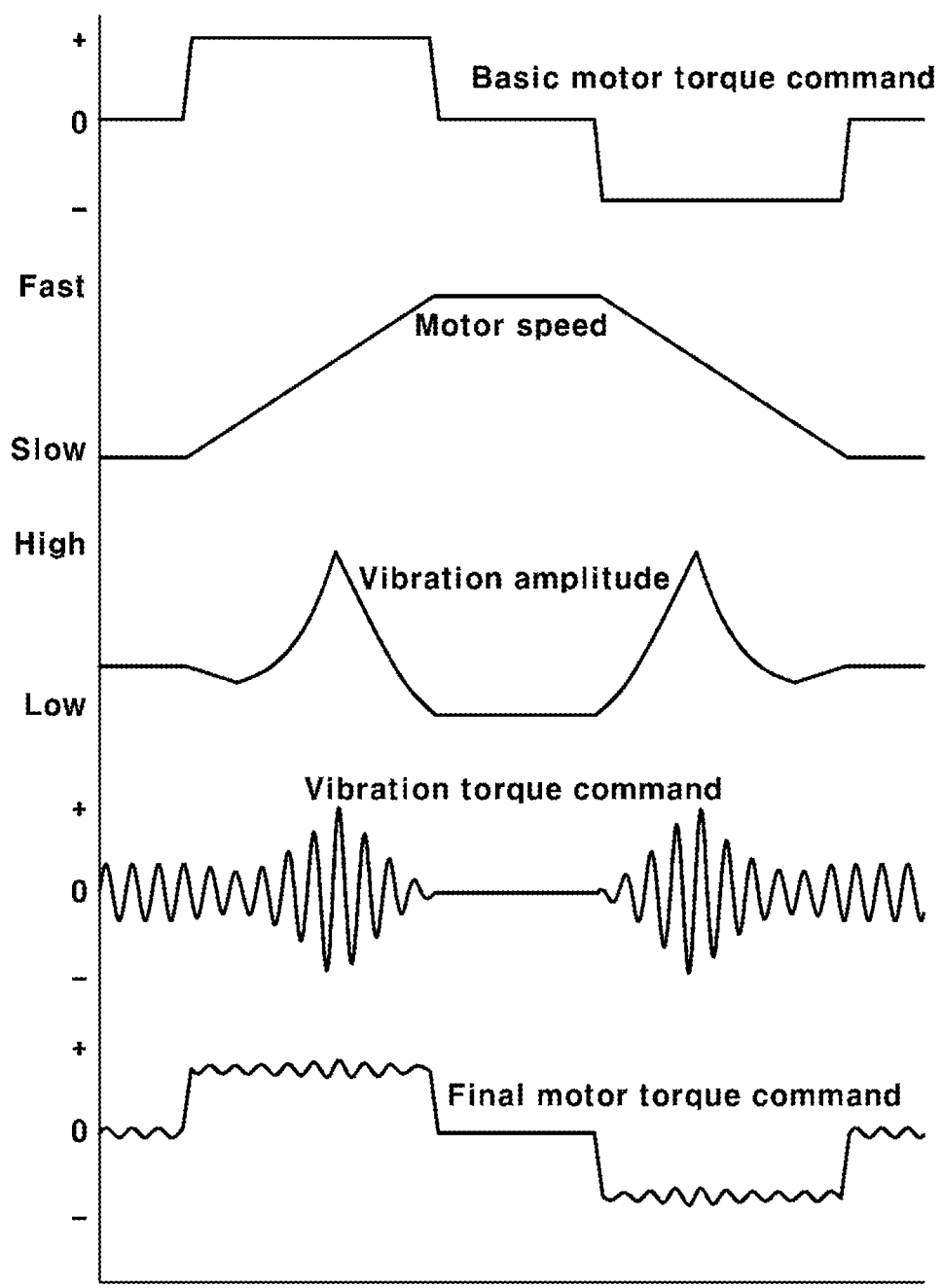
FIG. 6 is a diagram illustrating an example in which a vibration level is determined from drive system speed information according to another form of the present disclosure.

FIG. 6 is a diagram illustrating a state in which a final motor torque command for realizing virtual internal combustion engine vibration generated on the basis of the vibration amplitude determined from drive system speed information according to another form of the present disclosure. In the form of FIG. 6, as in the form of FIG. 4, when the basic motor torque command is determined and the motor speed is detected in real time, the vibration amplitude among the virtual vibration characteristics may be determined from the detected motor speed. Subsequently, when the vibration torque command having the determined vibration amplitude is determined, the final motor torque command may be determined by correcting the basic motor torque command with the vibration torque command. At this time, the final motor torque command may be determined as a value obtained by adding the vibration torque command to the basic motor torque command.

In the form of FIG. 6, the vibration amplitude is determined to represent the resonance of the secondary vibration system. Usually, the amplitude (vibration amplitude) increases at the velocity within the resonance region, and then decreases as the velocity is out of the resonance region. In light of this phenomenon, when the drive system speed (actual speed or virtual speed described above) is within a predetermined region, the vibration amplitude may be increased to a set value and then decreased.

Figure 7:
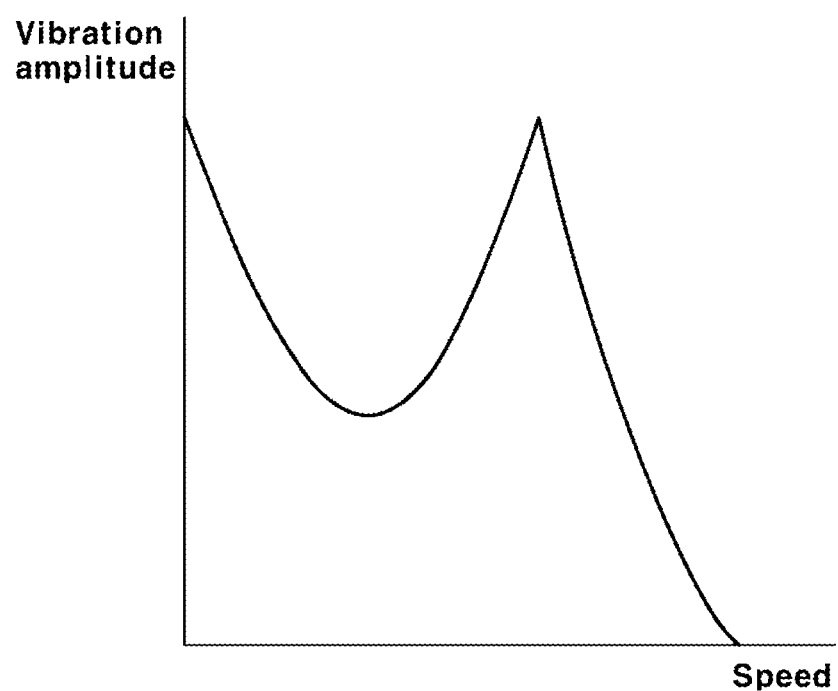
FIG. 7 is a diagram illustrating an example in which a vibration level is set depending on a speed so as to represent the resonance of a secondary vibration system according to another form of the present disclosure.

FIG. 7 is a diagram illustrating an example in which the vibration amplitude is set according to a speed so as to represent the resonance of a secondary vibration system according to one form of the present disclosure. In FIG. 7, the speed may be a virtual engine speed. As illustrated in FIG. 7, when the virtual engine speed is within a first region set to a relatively low (small) speed range, the vibration amplitude may be set to rapidly increase to a first set value and then decrease. In addition, when the virtual engine speed is within a second region set to a relatively high (large) speed range, the vibration amplitude may be set to rapidly increase to a second set value and then decrease.

In this case, the first region may be set as an idle speed region of an internal combustion engine, and the second region may be set as a speed region in which secondary natural vibration occurs. Also, the first set value and the second set value may be the same or different values. Accordingly, when the virtual engine speed is in the idling region, a first inherent vibration may be generated, and as the virtual engine speed increases, an effect corresponding to a second inherent vibration may also be generated.

Referring again to FIG. 6, as in the example of FIG. 7, when the vibration amplitude capable of representing the resonance of the secondary vibration system is determined, a vibration torque command having the determined vibration amplitude is determined, and then the final motor torque command may be determined by correcting the basic motor torque command with the vibration torque command. At this time, the final motor torque command may be determined as a value obtained by adding the vibration torque command to the basic motor torque command.

In FIG. 7, in addition to the virtual engine speed, the speed may be a motor speed, which is a drive system speed, or a vehicle speed. Here, the vehicle speed may be an actual vehicle speed detected by the speed detection unit, or may be a virtual vehicle speed calculated as a value directly proportional to the actual motor speed by using the actual motor speed and the virtual final reduction gear ratio as described above.

Figure 8:
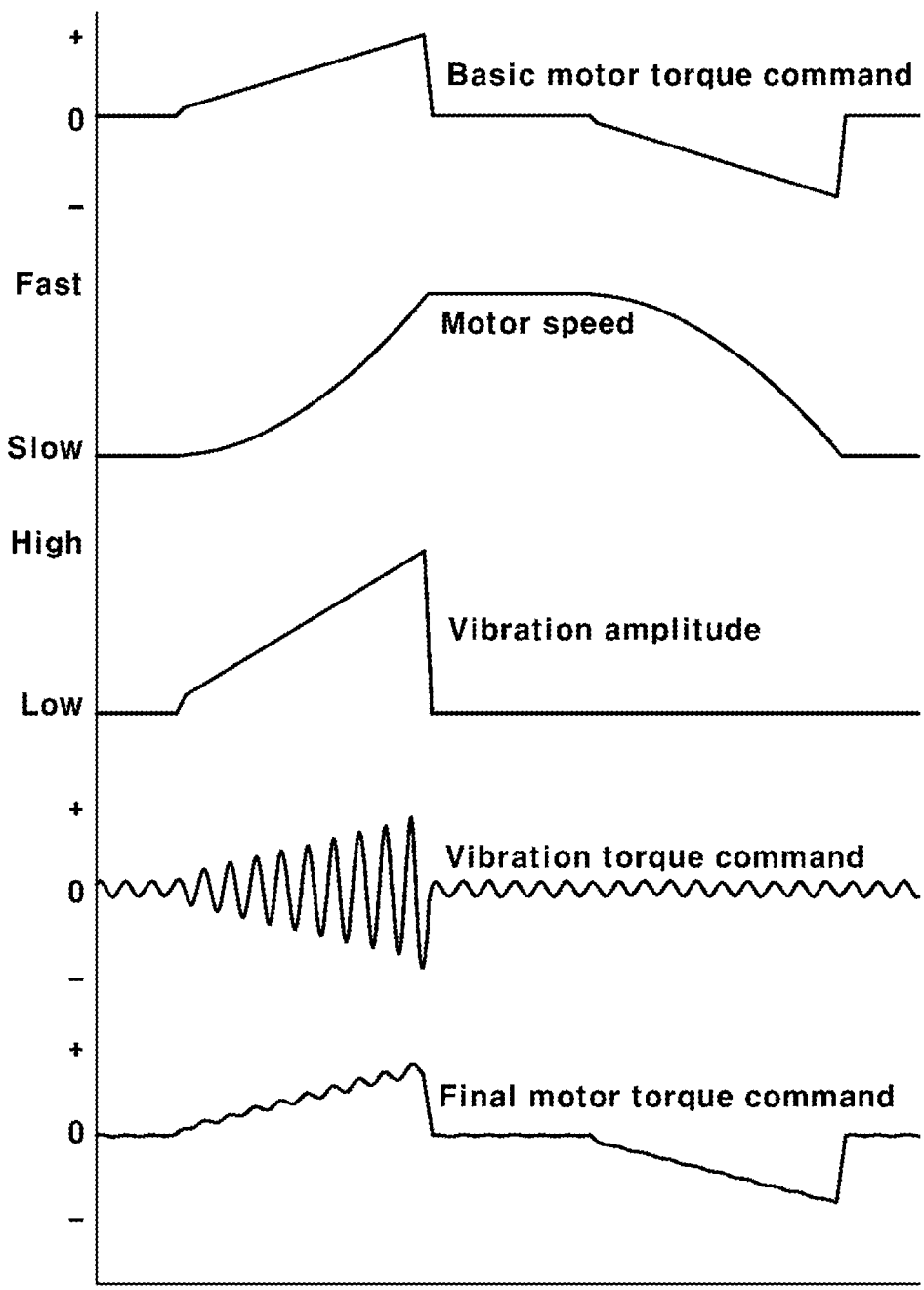
FIG. 8 is a diagram illustrating an example in which a vibration level is determined from drive system torque among actual driving variable information according to another form of the present disclosure.

FIG. 8 is a diagram illustrating a state in which a final motor torque command for realizing virtual internal combustion engine vibration generated on the basis of the vibration amplitude determined from drive system torque among actual driving variable information according to another form of the present disclosure. As illustrated, in determining the virtual vibration characteristics of the vibration torque command for realizing the virtual internal combustion engine vibration, the vibration amplitude among virtual vibration characteristics may be determined on the basis of the drive system torque.

Here, the drive system torque may be a motor torque, which may be a motor torque command. Specifically, the motor torque may be a basic motor torque command generated by the basic torque command generation unit 22. In addition, the motor torque may be replaced by an accelerator pedal input value (APS value). In other words, it is possible to determine the vibration amplitude, which is a virtual vibration characteristic, on the basis of the accelerator pedal input value. Further, the motor torque may be replaced by a load value.

Usually, as the load of an internal combustion engine increases, the amount of fuel injection and the explosive power increase, and the vibration transmitted to a vehicle body may also increase. In order to virtually produce such a vibration effect, as the motor torque or a load value corresponding to the command or the accelerator pedal input value is larger, the vibration amplitude, which is a virtual vibration characteristic, may be set to be determined as a larger value. In addition, since there is no fuel injection or explosion when the engine brake is operated, in order to represent the effect of less vibration, when the motor torque is zero or the regenerative torque, which is a negative torque, the vibration amplitude may be set to a small value.

FIG. 9 is a diagram illustrating a state in which a final motor torque command for realizing virtual internal combustion engine vibration is generated on the basis of a vibration frequency among virtual vibration characteristics after being determined from drive system speed information according to one form of the present disclosure. The vibration frequency (or cycle) is an essential element to produce a more realistic virtual vibration. In the present disclosure, the vibration frequency of the virtual vibration characteristics may be determined on the basis of the drive system speed, which is actual driving variable information.

Here, the drive system speed as the actual driving variable information that determines the vibration frequency may be the actual motor speed detected by the speed detection unit. At this time, the motor speed may be replaced by the vehicle speed. Alternatively, the vibration frequency may be determined on the basis of the virtual engine speed, which is a virtual drive system speed, as virtual state variable information. The vehicle speed may be an actual vehicle speed (actual driving variable information) detected by the speed detection unit, or a virtual vehicle speed (virtual state variable) calculated as a value in direct proportion to the actual motor speed by using the actual motor speed and the virtual final reduction gear ratio as described above. Since the vehicle speed is also related to the drive system speed such as the motor speed, it may be used as speed information for realizing the virtual internal combustion engine vibration according to the present disclosure.

Since the vibration of the internal combustion engine increases as the rotary speed (rpm) increases (faster), the vibration frequency among the virtual vibration characteristics may also be determined to have a larger value as the actual drive system speed or the virtual drive system speed increases. That is, as illustrated in FIG. 9, as the motor speed increases, the vibration frequency may increase proportionally.

In addition, as illustrated in FIG. 9, when the basic motor torque command is determined and the motor speed is detected in real time, the vibration frequency among the virtual vibration characteristics may be determined from the detected motor speed. Subsequently, when the vibration torque command having the determined vibration frequency is determined, the final motor torque command may be determined by correcting the basic motor torque command with the vibration torque command. At this time, the final motor torque command may be determined as a value obtained by adding the vibration torque command to the basic motor torque command.

Next, FIG. 10 is a diagram illustrating another method of determining virtual vibration characteristics according to the present disclosure, wherein a plurality of virtual vibration characteristics may be simultaneously determined and applied. That is, for example, the vibration amplitude among the virtual vibration characteristics may be determined by using the drive system speed (e.g., the actual motor speed or the virtual engine speed) and the drive system torque (e.g., the basic motor torque command or the accelerator pedal input value) at the same time.

For example, as described above, after determining the vibration amplitude on the basis of the drive system speed and determining the vibration amplitude on the basis of the drive system torque, the final vibration amplitude may be determined from the vibration amplitude based on the drive system speed and the torque amplitude based on the drive system torque. In this case, the final vibration amplitude may be determined by multiplying the drive system speed-based vibration amplitude and the drive system torque-based vibration amplitude.

In this case, the vibration frequency may be determined from the drive system speed as described in FIG. 9. For example, the vibration frequency may be determined from the motor speed, and the greater the motor speed, the larger the vibration frequency may be determined.

In determining the vibration amplitude on the basis of the drive system speed and the drive system torque, the drive system speed may be an actual drive system speed detected by a speed detection unit, or a virtual drive system speed determined from the actual drive system speed, or vehicle speed, as described above. In addition, the drive system torque may be a basic motor torque command as a motor torque or an accelerator pedal input value (APS value).

As a result, when both the vibration amplitude and vibration frequency are determined as described above, the vibration torque command having the determined vibration amplitude and vibration frequency is determined, and then the final motor torque command may be determined by correcting the basic motor torque command with the vibration torque command. At this time, the final motor torque command may be determined as a value obtained by adding the vibration torque command to the basic motor torque command.

In this way, after determining the vibration torque command using a plurality of virtual vibration characteristics, the final motor torque command may be determined and generated using the basic motor torque command and the vibration torque command, and then the operation of the driving motor may be controlled according to the generated final motor torque command, so that the virtual internal combustion engine vibration may be generated by the driving motor.

Although the various forms of the present disclosure have been described in detail, the scope of the present disclosure is not limited to the above-described forms, and various modifications and changes performed by those skilled in the art using the basic concepts of the present disclosure defined in the following claims are also included in the scope of the present disclosure.

What is claimed is:

1. A method of generating a virtual internal combustion engine vibration, using a controller, in an electric vehicle, the method comprising:
   collecting driving variable information;
   determining a virtual internal combustion engine vibration characteristic based on the collected driving variable information;
   determining a vibration torque command having the determined virtual internal combustion engine vibration characteristic;
   determining a final motor torque command using a basic motor torque command determined from the collected driving variable information and the determined vibration torque command; and
   controlling the operation of a vehicle driving motor according to the determined final motor torque command.

2. The method according to claim 1, wherein the virtual internal combustion engine vibration characteristic includes a vibration frequency and a vibration amplitude.

3. The method according to claim 1, wherein in determining the virtual internal combustion engine vibration characteristic, driving variable information for determining the virtual internal combustion engine vibration characteristic is one of an actual drive system speed detected by a speed detection unit in the vehicle, a virtual drive system speed determined from the actual drive system speed, or a vehicle speed.

4. The method according to claim 3, wherein the virtual drive system speed is a virtual engine speed, and the virtual engine speed is determined as a multiple value of the actual drive system speed.

5. The method according to claim 3, wherein the actual drive system speed is a motor speed that is a rotary speed of a driving motor, a wheel speed of a driving wheel, or a drive shaft speed.

6. The method according to claim 3, wherein the virtual internal combustion engine vibration characteristic includes a vibration amplitude, and
   wherein in determining the virtual internal combustion engine vibration characteristic, the vibration amplitude is determined to be smaller as the actual drive system speed, the virtual drive system speed, or the vehicle speed is larger.

7. The method according to claim 3, wherein the virtual internal combustion engine vibration characteristic includes a vibration frequency, and in determining the virtual internal combustion engine vibration characteristic, the vibration frequency is determined to be larger as the actual drive system speed, the virtual drive system speed, or the vehicle speed is larger.

8. The method according to claim 3, wherein the virtual internal combustion engine vibration characteristic includes a vibration amplitude, and
in determining the virtual internal combustion engine vibration characteristic, the vibration amplitude is determined to increase to a set value and then decrease when the actual drive system speed, the virtual drive system speed, or the vehicle speed is within a predetermined region.

9. The method according to claim 8, the method further comprising:
producing, by the controller, an effect corresponding to a secondary inherent vibration as the actual drive system speed or virtual drive system speed increases,
wherein in determining the virtual internal combustion engine vibration characteristic,
the vibration amplitude is determined to increase to a first predetermined set value and then decrease when the actual drive system speed or the virtual drive system speed is within a first region defined as a relatively low speed range, and
the vibration amplitude is determined to increase to a second predetermined set value and then decrease when the actual drive system speed or the virtual drive system speed is within a second region defined as a higher speed range than the first region.

10. The method according to claim 9, wherein the first region is an idling speed region of an internal combustion engine.

11. The method according to claim 3, wherein the vehicle speed is an actual vehicle speed detected through a sensor, or a virtual vehicle speed obtained from the actual drive system speed.

12. The method according to claim 1, wherein in determining the virtual internal combustion engine vibration characteristic, the driving variable information includes one selected from an accelerator pedal input value determined based on an accelerator pedal operation of a driver or the basic motor torque command.

13. The method according to claim 12, wherein the virtual internal combustion engine vibration characteristic includes a vibration amplitude, and
in determining the virtual internal combustion engine vibration characteristic, the vibration amplitude is determined to be larger as the accelerator pedal input value or the basic motor torque command is larger.

14. The method according to claim 12, wherein the virtual internal combustion engine vibration characteristic includes a vibration frequency, and
in determining the virtual internal combustion engine vibration characteristic, the vibration frequency is determined to be larger as the accelerator pedal input value or the basic motor torque command is larger.

15. The method according to claim 1, wherein in determining the virtual internal combustion engine vibration characteristic, the driving variable information includes:
one of speed information selected from an actual drive system speed detected by a speed detection unit in the vehicle, a virtual drive system speed determined from the actual drive system speed, or a vehicle speed; and
one of information selected from an accelerator pedal input value determined based on an accelerator pedal operation of a driver or the basic motor torque command, and
wherein the virtual internal combustion engine vibration characteristic includes a vibration frequency and a vibration amplitude.

16. The method according to claim 15, wherein in determining the virtual internal combustion engine vibration characteristic, a final vibration amplitude is determined by multiplying the vibration amplitude determined from the selected speed information by the vibration amplitude determined from the accelerator pedal input value or the basic motor torque command, and
the vibration frequency is determined from the selected speed information, the accelerator pedal input value or the basic motor torque command.

17. The method according to claim 15, wherein the virtual drive system speed is a virtual engine speed, and the virtual engine speed is determined as a multiple value of the actual drive system speed.

18. The method according to claim 15, wherein the actual drive system speed is a motor speed that is a rotary speed of a driving motor, a wheel speed of a driving wheel, or a drive shaft speed.

* * * * *